No. 770,509. PATENTED SEPT. 20, 1904.
T. M. SMITH.
PENHOLDER.
APPLICATION FILED APR. 23, 1903. RENEWED MAR. 3, 1904.
NO MODEL.

Attest:
C. S. Middleton
Edward Sarton

Inventor.
Thomas Marshall Smith.
by His Spear Company
attys.

No. 770,509.

Patented September 20, 1904.

UNITED STATES PATENT OFFICE.

THOMAS MARSHALL SMITH, OF BALTIMORE, MARYLAND.

PENHOLDER.

SPECIFICATION forming part of Letters Patent No. 770,509, dated September 20, 1904.

Application filed April 23, 1903. Renewed March 3, 1904. Serial No. 196,318. (No model.)

*To all whom it may concern:*

Be it known that I, THOMAS MARSHALL SMITH, a citizen of the United States, residing at Baltimore, Maryland, have invented certain new and useful Improvements in Penholders, of which the following is a specification.

My invention relates to penholders, and particularly to the ferrule or tubular part thereof holding the pen.

The invention is primarily designed for use in connection with a pen-removing device for which Letters Patent of the United States were granted me on the 17th day of July, 1900, No. 654,098. In my former invention the pen-removing point is held in the end of the holder and is concealed within the end of the ferrule fitting over the reduced end of the penholder. It is necessary in the use of the pen-removing device to remove the ferrule from the holder, and in order that this may not interfere with the stability of the parts I have devised means for permitting the ready removal of the ferrule, while at the same time preventing its accidental removal, this feature of the invention consisting in a friction device adapted to hold the ferrule in place and make necessary a slight pressure in order to remove it.

My experience has shown, while not impracticable to use with my invention the ordinary metal or rubber ferrules, that they are objectionable, and the latter especially so, by reason of the fact that they are readily ruptured or broken by undue pressure, and, indeed, they break frequently in the act of removing the ferrule from the holder to expose the pen-removing point, and for this reason I found it necessary to construct the ferrule for use in connection with my improvement of a more durable material, and in seeking for such an article I found that I could use with the most satisfactory results a vulcanized fiber. This material requires to be specially treated in order to adapt it for my purpose; but when subjected to the hereinafter-described method I find it to be a perfect material for my purpose. It is practically indestructible and is equal to any amount of strain and wear to which it can be subjected under the circumstances of the use to which I put it.

My invention consists, therefore, in a ferrule for penholders made out of vulcanized fiber in the first place, and in the second place it consists of frictional holding means to retain the ferrule in place upon the holder.

Figure 1:
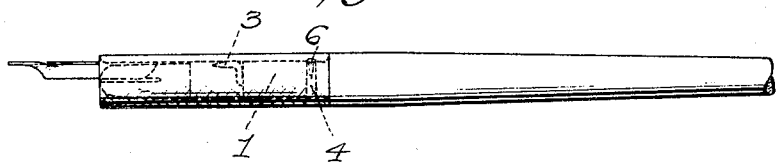
Figure 2:
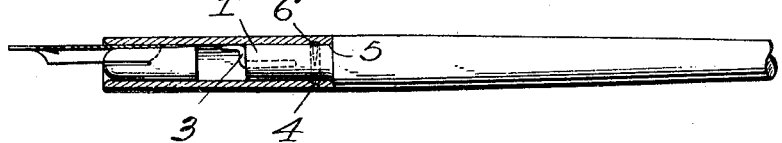
Figure 3:
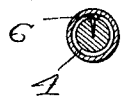

In the accompanying drawings, Figure 1 is an elevation of my improved ferrule. Fig. 2 is a longitudinal section, and Fig. 3 is a transverse section.

The handle has a shank 1, preferably longer than those on ordinary penholders, so as to give a proper bearing. Fitted to this shank is the ferrule-tube. The improved pen-removing point heretofore patented by me is shown at 3. Near the upper end of the ferrule, on the inside, is formed a groove 4, and the opening in the extreme end of the ferrule is slightly enlarged by reaming, as shown at 5. Embedded in the periphery of the shank of the handle is a small pin 6, which has a crown shape or rounded head projecting slightly above the periphery of the shank. The reamed-out end of the ferrule permits the head of the pin to enter the ferrule, and a slight pressure will force it over the inner surface to the position of the groove, which serves to lock it in place and prevent accidental displacement. There is sufficient elasticity to allow the ferrule to be removed, however, on the exertion of slight pressure.

In the manufacture of the ferrule I take vulcanized fiber made of proper dimensions, and I first reduce the exterior surface to a uniform periphery by subjecting the fiber to heavy compression while running it at a high rate of speed, pouring oil over the surface as it is being compressed. This not only reduces the exterior surface, but burnishes the same. I find that this gives the exterior a smooth even finish and a high polish. I then bore out the center evenly, so as to make the thickness of the walls uniform and adapting the bore of the tube to the shank of the holder. The pieces of fiber are then cut in proper lengths for the purposes of my invention.

As above stated, I have found it impossible to break or injure the ferrules made of this material and in this manner by the most severe use to which the material will be subjected in a penholder, and I find the material under the treatment stated to have peculiarly desirable qualities for the ferrule of a penholder, as it not only absorbs moisture from the fingers, preventing their slipping, but it has a soft velvety feeling. It is impossible, as is the case with hard rubber, to break the ferrule when inserting a pen. It will also be noted that as the groove is continuous in the upper part of the ferrule the holder can be inserted any place and does not require to be put in in any certain position, and it can be withdrawn in like manner. This lock or retainer also serves to prevent the parts from becoming accidentally detached in case of shrinkage of the wooden part. This frequently happens in ordinary penholders where metal or rubber is used; but it is rendered impossible in my improved form.

What I claim is—

1. A ferrule for penholders composed of compressed vulcanized fiber, said ferrule having moisture-absorbent quality, all substantially as described.

2. A ferrule for penholders having a groove near its upper end on its interior face combined with a projection on the holder adapted to engage said groove, substantially as described.

3. A ferrule for penholders having a groove on its inner face and having its end reamed or enlarged, combined with a penholder having a projection adapted to engage the groove, substantially as described.

In testimony whereof I affix my signature in presence of two witnesses.

THOMAS MARSHALL SMITH.

Witnesses:
HENRY E. COOPER,
R. E. OURAND.